(12) United States Patent
Kikin Gil et al.

(10) Patent No.: US 11,086,824 B2
(45) Date of Patent: Aug. 10, 2021

(54) INLINE DOCUMENT CONVERSATION SYSTEM

(71) Applicant: Microsoft Technology Licensing, LLC, Redmond, WA (US)

(72) Inventors: Erez Kikin Gil, Bellevue, WA (US); Seth Fox, Redmond, WA (US); Daniel P. Costenaro, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 16/278,563

(22) Filed: Feb. 18, 2019

(65) Prior Publication Data

US 2020/0265013 A1 Aug. 20, 2020

(51) Int. Cl.
| | |
|---|---|
| *G06F 40/166* | (2020.01) |
| *G06F 16/176* | (2019.01) |
| *G06F 40/103* | (2020.01) |
| *G06F 40/169* | (2020.01) |
| *G06F 3/0486* | (2013.01) |

(52) U.S. Cl.
CPC .......... *G06F 16/176* (2019.01); *G06F 3/0486* (2013.01); *G06F 40/103* (2020.01); *G06F 40/166* (2020.01); *G06F 40/169* (2020.01)

(58) Field of Classification Search
CPC .......... G06F 16/20; G06F 16/30; G06F 17/20; G06F 17/30; G06F 3/048; G06F 40/10; G06F 16/176; G06F 40/103; G06F 40/169; G06F 3/0486; G06Q 10/101
See application file for complete search history.

(56) References Cited

U.S. PATENT DOCUMENTS

| | | | |
|---|---|---|---|
| 8,086,960 B1 * | 12/2011 | Gopalakrishna | ...... G06F 16/986 715/266 |
| 10,042,832 B1 * | 8/2018 | Vagell | ................... G06F 40/103 |
| 2004/0085354 A1 * | 5/2004 | Massand | ............... G06F 40/197 715/751 |

(Continued)

OTHER PUBLICATIONS

"International Search Report and Written Opinion Issued in PCT Application No. PCT/US20/018898", dated Apr. 9, 2020, 11 Pages.

(Continued)

*Primary Examiner* — Sanchita Roy
(74) *Attorney, Agent, or Firm* — Schwegman Lundberg & Woessner, P.A.

(57) ABSTRACT

Systems and methods for managing an inline conversation area within a document are provided. In example embodiments, a collaboration system causes presentation of a user interface displaying a document that is being collaboratively edited by a plurality of users. The collaboration system receives an indication to present an inline conversation area within the document. In response, the inline conversation area is displayed within the document on the user interface, whereby the inline conversation area is visually distinguished from content of the document. The collaboration system receives, via the inline conversation area, input from the plurality of users. The input comprises comments being exchanged between the plurality of users and draft content. The inputs are displayed in the inline conversation area within the document on the user interface.

18 Claims, 18 Drawing Sheets

(56) References Cited

U.S. PATENT DOCUMENTS

| | | | | |
|---|---|---|---|---|
| 2004/0205653 | A1* | 10/2004 | Hadfield | G06Q 10/10 |
| | | | | 715/255 |
| 2008/0270406 | A1* | 10/2008 | Flavin | G06F 16/38 |
| 2009/0249224 | A1* | 10/2009 | Davis | G06Q 10/10 |
| | | | | 715/753 |
| 2010/0208070 | A2* | 8/2010 | Haynes | G07C 5/085 |
| | | | | 348/148 |
| 2013/0014009 | A1* | 1/2013 | Kim | G06F 40/10 |
| | | | | 715/255 |
| 2013/0097481 | A1 | 4/2013 | Kotler et al. | |
| 2013/0326330 | A1* | 12/2013 | Harris | G06F 40/166 |
| | | | | 715/234 |
| 2014/0149857 | A1* | 5/2014 | Vagell | G06F 40/166 |
| | | | | 715/255 |
| 2015/0193492 | A1* | 7/2015 | Gunaratne | G06F 40/166 |
| | | | | 707/609 |
| 2017/0286416 | A1* | 10/2017 | Gan | G06F 16/176 |
| 2019/0129973 | A1* | 5/2019 | Truong | G06F 16/176 |

OTHER PUBLICATIONS

Wallen, Jack, "How to Drag and Drop Notes from Google Keep Into Google Docs—Tech Republic", Retrieved From: https://www.techrepublic.com/article/how-to-drag-and-drop-notes-from-google-keep-into-google-docs/, Apr. 9, 2018, 7 pages.

* cited by examiner

INLINE DOCUMENT CONVERSATION SYSTEM

TECHNICAL FIELD

The subject matter disclosed herein generally relates to special-purpose machines configured to provide a collaborative document processing system, and to the technologies by which such special-purpose machines become improved compared to other machines that manage a collaborative document processing system. Specifically, the present disclosure addresses systems and methods that provides an inline conversation area in a document for a conversation with a capability to transform draft content in the inline conversation area to document content.

BACKGROUND

Conventionally, when users provide comments in a document that is being collaboratively worked on, the users provide the comments in one or more comment bubbles to a side margin of the document. The comment bubbles are separate from content in the document and is typically linked to a portion of the content by a reference line. In cases where many comment bubbles are used, the number of reference lines can be confusing and hard to discern. Alternatively, a user can perform their own formatting to distinguish document content from comments (e.g., use highlighting, using different font type or color, provide within brackets), which can be time consuming, cumbersome, and tedious.

BRIEF DESCRIPTION OF THE DRAWINGS

Some embodiments are illustrated by way of example and not limitation in the figures of the accompanying drawings.

FIG. 5A-FIG. 5H are example screen shots of user interfaces illustrating usage of the inline conversation area, according to one embodiments.

FIG. 6A to FIG. 6E are example screen shots of user interfaces illustrating usage of the inline conversation area, according to an alternative embodiment.

DETAILED DESCRIPTION

Figure 1:
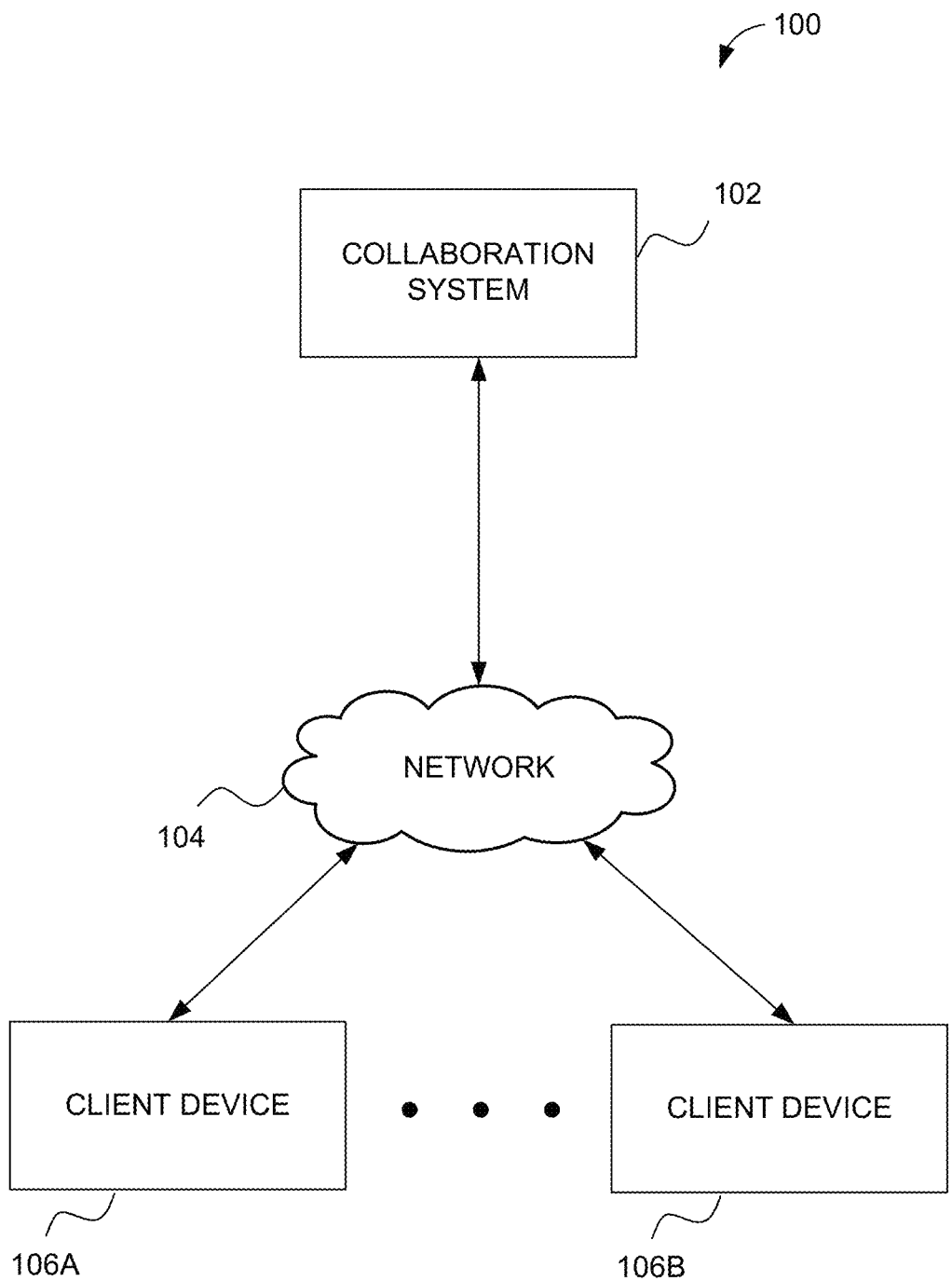
FIG. 1 is a diagram illustrating a network environment suitable for providing an inline conversation area in a document with draft content transformation capabilities, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for optimizing a collaborative process by providing an inline document conversation area (also referred to herein as "inline conversation area") within the content (and context) of the document. In example embodiments, a collaboration system presents a user interface displaying a document that is being collaboratively edited by a plurality of users. The collaboration system receives an indication to present an inline conversation area within the document (e.g., at or near a location where the inline conversation area is to be added). In response, the inline conversation area is displayed within the document on the user interface (e.g., between document content in the document), whereby the inline conversation area is visually distinguished from content of the document (also referred to herein as "document content").

The collaboration system receives, via the inline conversation area, input from the plurality of users. The input comprises comments being exchanged between the plurality of users and draft content. The inputs are displayed in the inline conversation area within the document on the user interface. In some embodiments, the draft content can be incorporated into the content of the document in response to an insert command received from one of the plurality of users.

Further still, the collaboration system collapses the inline conversation area (or portions of the inline conversation area) under certain conditions. For example, a user may make a selection that triggers hiding of some or all of the inline content in the inline conversation area. Additionally, the collaboration system can display or visually distinguishes only comments determined, based on machine learning, to be relevant to the user.

Accordingly, the collaboration system provides inline document conversation functionality that includes displaying an inline conversation area within the content of a document (as opposed to a comment bubble at a side margin of the document). The inline conversation area allows a plurality of users to collaborate on the document by exchanging comments in the inline conversation area relative to the content that the comments are directed. Further still, draft content presented and edited within the inline conversation area can be easily incorporated into the content of the document. Thus, example methods (e.g., algorithms) and example systems (e.g., special-purpose machines) are configured to improve a document collaboration process and system by providing an inline conversation area with draft content transformation capabilities. Therefore, one or more of the methodologies described herein facilitate solving technical problems associated with efficiently exchanging comments and content between users collaborating on a document.

FIG. 1 is a diagram illustrating a network environment 100 suitable for providing and managing an inline conversation area in a document with draft content transformation capabilities, according to example embodiments. The network environment 100 includes a collaborative system 102 communicatively coupled via a network 104 to a plurality of client devices 106. In example embodiments, the collaborative system 102 comprises components that provide a user interface that includes an inline conversation area, displays comments, allows editing of draft content in the inline conversation area, manages the incorporation of the draft content into the content of the document, and determines whether to collapse comments and the comments to be collapsed. The components of the collaboration system 102 are described in more detail in connection with FIG. 2 and may be implemented in a computer system, as described below with respect to FIG. 7.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the client devices 106 are portable electronic devices such as smartphones, tablet devices, laptops, desktop computers, or similar devices that allow users to create, review, and edit documents. The client devices 106 each comprises one or more processors, memory, displays, wireless or wired networking systems, and input devices. In some embodiments, the client devices 106 interacts with the collaborative system 102 through a client application (not shown) stored thereon. The client application of the client devices 106 allows for exchange of information with the collaborative system 102 via user interfaces. The client application 108 also receives information from the networked system 102 and presents the information on the user interfaces.

In example embodiments, a first user operates the client device 106a that communicates with the networked system 102 to collaborate on a document. Similarly, a second user operates the client device 106b to communicate with the collaborative system 102 to collaborate on the document with the first user (and any number of other users authorized to collaborate on the document). The collaborative system 102, upon request, creates an inline conversation area within the content of the document where the first user and the second user can exchange comments. Additionally, the first user or second user can present draft content which can be reviewed and edited by other users authorized to collaborate on the document. In some example, the draft content is incorporated into the content of the document in response to an insert command or operation. Other operations available through the inline conversation area will be discussed in detail below.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any functions described herein for any system or device illustrated in FIG. 1 may be subdivided among multiple systems or devices. Additionally, any number of client devices 106 may be embodied within the network environment 100. Furthermore, some components or functions of the network environment 100 may be combined or located elsewhere in the network environment 100. For example, some of the functions of the collaborative system 102 may be embodied within other systems or devices of the network environment 100 (e.g., in the client device 106). Additionally, some of the functions of the client device 106 may be embodied within the collaborative system 102. While only a single collaborative system 102 is shown, alternative embodiments may contemplate having more than one collaborative system 102 to perform server operations discussed herein for the collaborative system 102.

Figure 2:
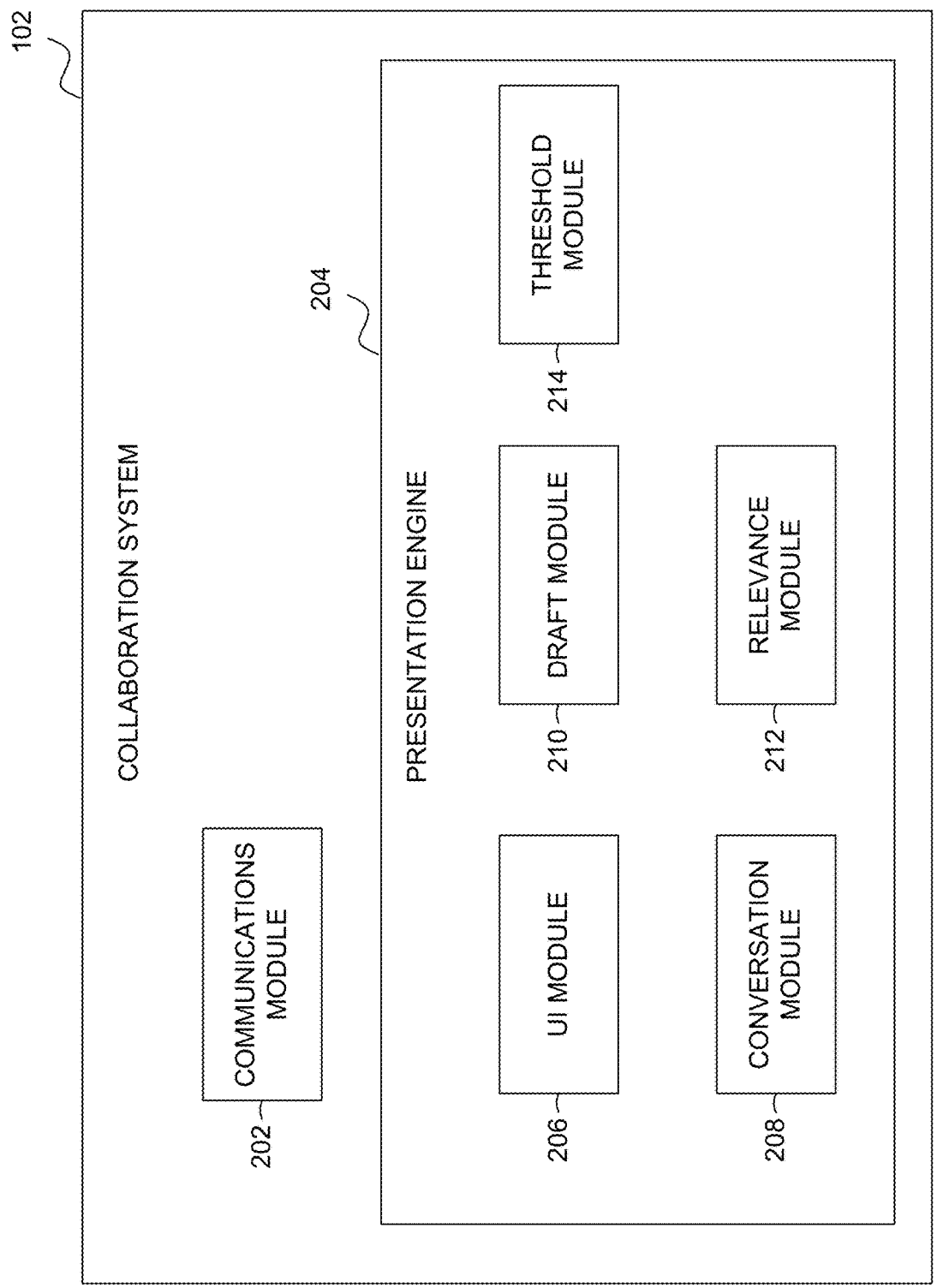
FIG. 2 is a block diagram illustrating components of a collaboration system for managing the inline conversation area, according to some example embodiments.

FIG. 2 is a block diagram illustrating components of the collaborative system 102 for providing and managing an inline conversation area within a document, according to some example embodiments. In various embodiments, the collaborative system 102 allows user to exchange comments and edits to draft content in the inline conversation area. The collaborative system 102 also determines relevance of comments to the draft content and to each user that is collaborating on the document. Further still, the collaborative system 102 determines when to collapse (e.g., hide) comments (e.g., based on relevance or number of comments exceeding a threshold) and which comments to collapse. To enable these operations, the collaborative system 102 comprises a communication module 202 and a presentation engine 204 that manages presentation of documents being collaborated on as well functionalities associated with the inline conversation area. The presentation engine 204 includes a user interface (UI) module 206, a conversation module 208, a draft module 210, a relevance module 212, and a threshold module 214 all configured to communicate with each other (e.g., via a bus, shared memory, or a switch). The collaborative system 102 may also comprise other components (not shown) that are not pertinent to example embodiments. Furthermore, any one or more of the components (e.g., engines, modules) described herein may be implemented using hardware (e.g., a processor of a machine) or a combination of hardware and software. Moreover, any two or more of these components may be combined into a single component, and the functions described herein for a single component may be subdivided among multiple components.

The communications module 202 is configured to exchange data with the client devices 106 and cause presentation of one or more user interfaces generated by the presentation engine 204 on a display device (e.g., display screen) of the client devices 106 including user interfaces that display a document being collaborated on by a plurality of users and display an inline conversation area. In some embodiments, the communication module 202 generates and transmits instructions (or the user interfaces themselves) to the client devices 106 to cause the user interfaces to be displayed on the client devices 106. The communications module 202 also receives, via the user interfaces, comments, draft content, and edits to the draft content in the inline conversation area as well commands/instructions to hide comments, hide draft content, and insert draft content into the content of the document.

The UI module 206 manages generation of user interfaces that are presented at the client devices 106. In example embodiments, the UI module 206 generates and causes presentation of user interfaces (e.g., sends the UI or instructions to generate the user interface via the communications module 202) on the client devices 106. In example embodiments, the UI module 206 presents a document that is being collaborated on between a plurality of users. The UI module 206 further presents, within the content of the document (e.g., between lines of text that comprise the content of the document), an inline conversation area. The inline conversation area is visually distinguished from the content of the document. For example, the inline conversation area can be offset (e.g., indented) from the content, be in a different font or font style, be shown as a box within the content, or in any other manner that causes the appearance of the inline conversation area to be different than the content of the document.

The conversation module 208 manages comments within the inline conversation area. In example embodiments, the conversation module 208 receives, via the communications module 202, an indication to present the inline conversation area within the document. The indication is triggered near a location in the document where the inline conversation area it to be presented. In response to receiving the indication, the conversation module 208 triggers the UI module 206 to present the inline conversation area. For example, the first user at client device 106*a* can indicate to present an inline conversation area between a second and a third paragraph of the document. This location may be selected by the first user because, for example, the first user wants to make a comment regarding the second or third paragraph or wants to discuss adding new content between the second and third paragraphs.

Once the inline conversation area is presented, any user authorized to work on the document can provide comments in the inline conversation area. Each comment from a different user is associated with an identifier of the user. For example, an image of the user is presented next to their comment. In another example, a name or initials of the user is presented next to their comment.

In example embodiments, a user can choose to collapse comments from one or more other users. For example, the user may be conversing with two other users and only wants to see the comments from a first user. In this case, the user can collapse the comments from the second user. The user collapses by triggering a collapse command associated with the second user (e.g., selecting a collapse icon displayed on the user interface that is associated with the second user), which causes the conversation module 208 to collapse the comments from the second user. Further still, the user can collapse comments from more than one user or for all users, collapse a draft content portion (described further below) of the inline conversation area, or collapse the entire inline conversation area by selecting a corresponding collapse icon. Conversely, the user can choose to display portions of the collapsed comments or the collapsed draft content portion by selecting a corresponding expand icon. In some cases, the expand icon and the collapse icon may be the same icon.

The draft module 210 manages draft content that is input in the inline conversation area. The draft content is content that is proposed to be added to the content of the document. In example embodiments, the draft content is visually distinguished from the comments in the inline conversation area. For example, the draft content can be offset from the comments; be shown in a different font type, style, or color; or be displayed in a shaded portion of the inline conversation area.

By having the draft content inputted and edited in the inline conversation area, the users can easily exchange ideas regarding the draft content without actually editing or affecting the content of the document. In example embodiments, a first user initially provides the draft content. Subsequently, a second user provides an edit to the draft content. The draft module 210 visually distinguishes the edit from the original draft content. For example, deletions are shown as strikethroughs (sometimes with highlighting) and additions are underlined or highlighted. The draft module 210 also can track which user made each edit and provide a visual cue of the editing user associated with an edit when instructed.

The users can also decide whether to incorporate the draft data into the document. In one embodiments, the incorporation is triggered by a drag and drop operation. In this embodiment, the draft module 210 receives a selection of at least a portion of the draft content, an indication to drag the selected draft content to a location in the document, and an indication to drop the selected draft content into the location in the document. In response to receiving, the draft module 210 converts the selected draft content into new document content and inserts the new document content into the location indicated by the drop selection. As a result, the UI module 206 displays an updated document showing the new document content at the location in the document.

In an alternative embodiment, the draft module 210 receives an insert selection associated with the draft content. For example, an insert icon is presented relative to the draft content in the inline conversation area which can be selected by the user. In response to receiving the insert selection, the draft module 210 converts the draft content into new document content and inserts the new document content into the document below the inline conversation area.

Once the draft content is incorporated into the document, the inline conversation (e.g., comments) remains visible in accordance with one embodiments. This allows the users to facilitate additional conversation. In an alternative embodiment, once the draft content is incorporated into the document, the inline conversation (e.g., comments) are hidden. Thus, this embodiment facilitates the reading of the document. In some embodiments, the user(s) can set their preference as to whether the comments are visible after incorporation of the draft content.

The relevance module 212 manages display of relevant comments to a user. In example embodiments, the relevance module 212 detects comments in the inline conversation area that are relevant to the user and automatically collapses comments in the inline conversation area that are not relevant. In a further embodiment, the relevance module 212 detects comments in the inline conversation area relevant to the user and visually distinguishes the relevant comments.

In order to provide these functionalities, the relevance module 212 machine learns what is relevant to a user. For example, the relevance module 212 analyses the conversation (e.g., comments) in the inline conversation area and identifies key aspects such as due date and @mentions (e.g., where the user is mentioned by name). Additionally, the relevance module 212 detects time spent commenting on content of the document (or draft content), time spent editing draft content, or time spent reading comments or draft content in order to determine relevance. The more time a user spends, the more likely the comments are relevant. Additionally, over time, the relevance module 212 detects actions and keywords that the user uses in the inline conversation area to determine what is relevant to the user.

In some embodiments, the relevance module 212 can navigate the user to relevant portions of the inline conversation area. For example, when the user opens the application to access the document, the relevance module 212 instructs the UI module 206 to display the relevant portions of the inline conversation area to the user. Alternatively, the relevance module 212 instructs the UI module 206 to provide a feed of comments and draft content that is relevant to the user.

The threshold module 214 manages consolidation of the inline conversation area based on a predetermined threshold. When collaborating on a document, the comments and draft content exchanged in the inline conversation area can get exceedingly long making it difficult to view content of the inline conversation area in context within the document. The threshold module 214 detects whether content in the inline conversation area (e.g., the comments and/or the draft content) exceeds a predetermined threshold (e.g., in number of lines, number of characters or words). If the content in the inline conversation area exceeds the predetermined threshold, the threshold module 214 automatically collapses a portion of the inline conversation area (e.g., instructs the UI module 206 to present the inline conversation area with the portion collapsed). In some embodiments, the threshold module 214, in conjunction with the relevance module 212, automatically collapses comments that are not directly related to draft content in the inline conversation area.

Figure 3:
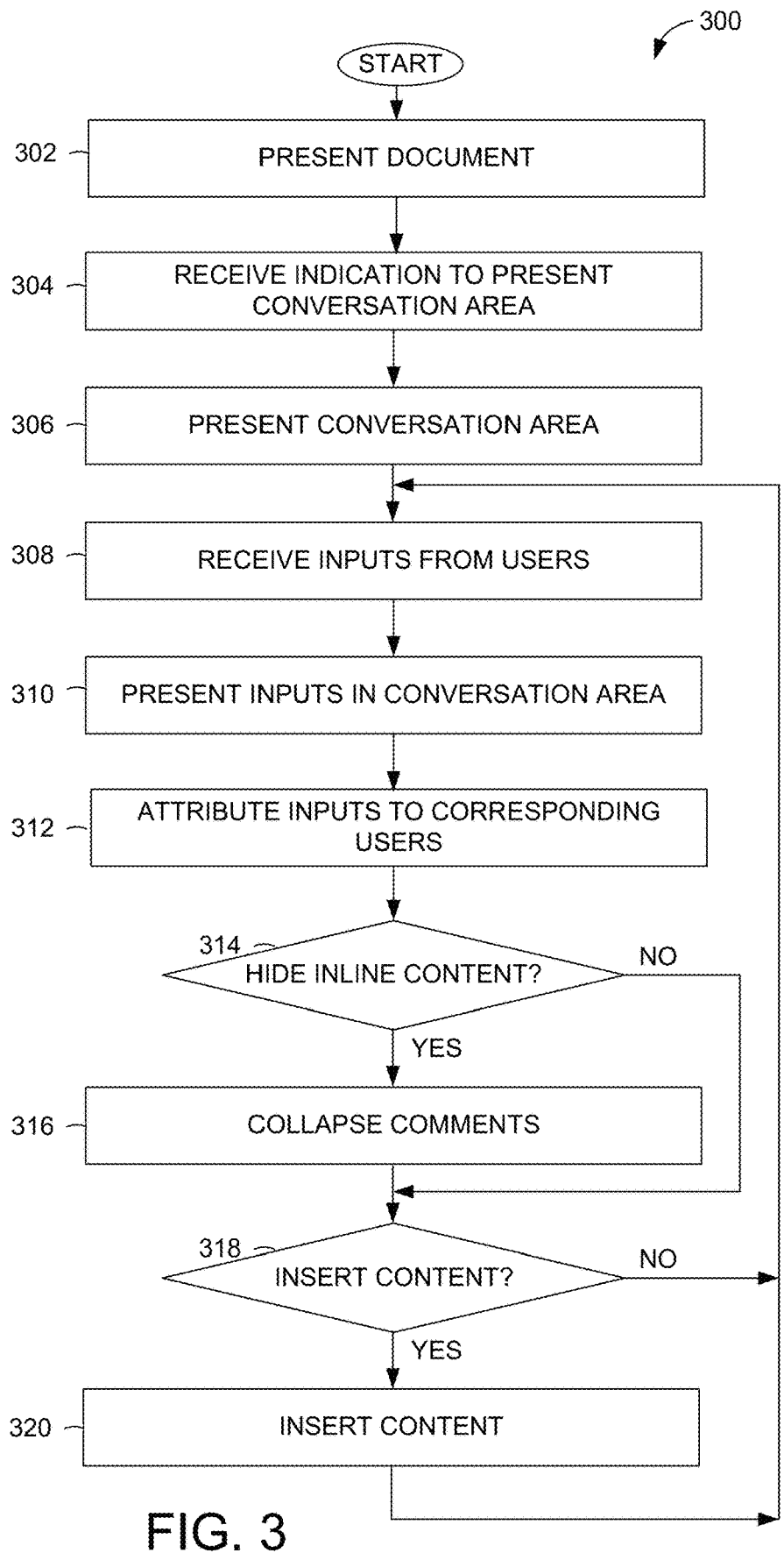
FIG. 3 is a flowchart illustrating operations of a method for managing an inline conversation area, according to some example embodiments.

The user can, at any time, expand the inline conversation area to view the portions collapsed by the relevance module 212, the threshold module 214, or previously collapsed by the user FIG. 3 is a flowchart illustrating operations of a method 300 for managing an inline conversation area, according to some example embodiments. Operations in the method 300 are performed by the collaboration system 102, using components described above with respect to FIG. 2. Accordingly, the method 300 is described by way of example with reference to the collaboration system 102. However, it shall be appreciated that at least some of the operations of the method 300 may be deployed on various other hardware configurations or be performed by similar components residing elsewhere in the network environment 100. Therefore, the method 300 is not intended to be limited to the collaboration system 102.

In operation 302, the document is presented, by the UI module 206 in a user interface to at least one user in a collaborative working environment. Accordingly, the UI module 206 generates the user interface and sends the user interface or instructions to generate the user interface via the communications module 202.

In operation 304, the collaboration system 102 receives an indication to present an inline conversation area in the document. In example embodiments, the conversation module 208 receives, via the communications module 202, an indication to present the inline conversation area within the document. In some cases, the indication is triggered near a location in the document where the inline conversation area is to be presented.

In operation 306, the inline conversation area is presented within the document (e.g., between content of the document). In example embodiments, the conversation module 208 triggers the UI module 206 to present the inline conversation area. The inline conversation area is visually distinguished from the content of the document. For example, the inline conversation area can be offset (e.g., indented) from the content, be in a different font color or font style, be shown as a box within the content, or in any other manner that causes the appearance of the inline conversation area to be different than the content of the document.

In operation 308, the collaboration system 102 (e.g., the conversation module 208 via the communications module 202) receive inputs from users. The inputs comprise comments from the users, draft content, and/or edits to the draft content. In operation 310, the UI module 206 (e.g., when instructed by the conversation module 208) presents the inputs in the inline conversation area. In example embodiments, the collaboration system 102 can detect and distinguish between conversations (e.g., comments) and draft content. As such, the collaboration system 102 can create a comment section as well as a separate draft content section within the inline conversation area either in response to user manual instructions or automatically in response to detecting keywords in the comments (e.g., "in the section below").

Further still, the collaboration system 102 tracks which inputs are from which users. Thus, in operation 312, the UI module 206 can visually attribute inputs to their corresponding user. For example, an edit made by a second user can be shown with an indication of an identifier (e.g., initials, name) of the second user. In another example, an identifier of the user providing the input can be displayed when a cursor hovers (or based on a right click operation) over the input.

In operation 314, a determination is made whether to hide inline content (e.g., comments or draft content) in the inline conversation area (also referred to as "inline content"). The inline content is hidden by collapsing a portion of the inline conversation area. Operation 314 will be discussed in more detail in connection with FIG. 4 below.

In operation 316, the inline content is collapsed in response to a determination, in operation 314, to hide the content. In some embodiments, the comments for one or more users are hidden based on operation 314. In some embodiments, draft content can be hidden based on operation 314. A user can, at any time, unhide or expand the hidden inline content, for example, by selecting an appropriate icon.

In operation 318, a determination is made whether to insert draft content into the document. In one embodiments, the insertion is triggered by a drag and drop operation whereby at least a portion of the draft content is selected, a drag indication received, and a drop indication at a location in the document is received. In an alternative embodiment, the draft module 210 receives an insert selection associated with the draft content. For example, an insert icon relative to the draft content in the inline conversation area can be selected.

In operation 320, the draft content is converted and inserted into the document in response to a determination to insert the draft content. In various embodiments, the draft content may have been edited by one or more users. In example embodiments, the draft module 210 accepts the edits and converts the draft content into new document content. The new document content is then inserted into the location indicated by the drop selection or inserted into the document below the inline conversation area.

Figure 4:
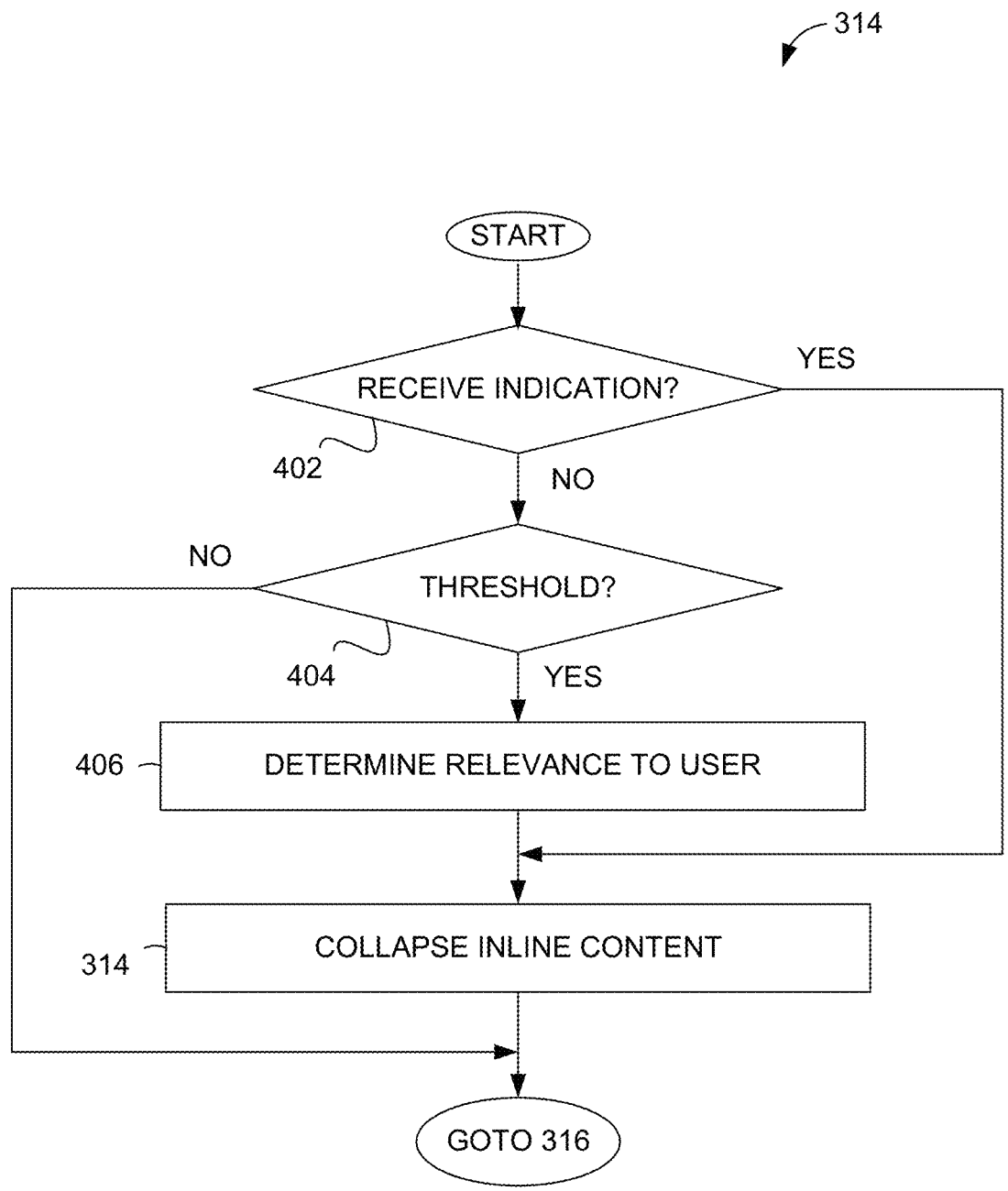
FIG. 4 is a flowchart illustrating operations of a method for determining whether to collapse comments in the inline conversation area, according to some example embodiments.

FIG. 4 is a flowchart illustrating operations of a method 400 for determining whether to collapse inline content in the inline conversation area, according to some example embodiments. Operations in the method 400 (e.g., operation 314) are performed by the collaboration system 102, using components described above with respect to FIG. 2. Accordingly, the method 400 is described by way of example with reference to the collaboration system 102. However, it shall be appreciated that at least some of the operations of the method 400 may be deployed on various other hardware configurations or be performed by similar components residing elsewhere in the network environment 100. Therefore, the method 400 is not intended to be limited to the collaboration system 102.

In operation 402, a determination is made whether a collapse indication or command is received from the user. In example embodiments, a user can choose to collapse comments from one or more other users. For example, the user triggers a collapse command associated with a particular user (e.g., selecting a collapse icon displayed on the user interface that is associated with the particular user). This causes the conversation module 208 to collapse the comments for the particular user in operation 314. Further still, the user can collapse comments from more than one user or all users, collapse a draft content portion of the inline conversation area, or collapse the entire inline conversation area by selecting a corresponding collapse icon.

If no indication is received in operation 402, then the method 400 proceeds to operation 404 where a determination is made whether a predetermined threshold amount of inline content is presented in the inline conversation area. The threshold module 214 manages consolidation of the inline conversation area based on the predetermined threshold. In some embodiments, the threshold module 214 detects whether content in the inline conversation area (e.g., the comments and/or the draft content) exceeds a predetermined threshold (e.g., number of lines, number of characters or words). If the content in the inline conversation area exceeds the predetermined threshold, the threshold module 214 automatically collapses a portion of the inline conversation area (e.g., sends instructions the UI module 206 to present the inline conversation area with the portion collapsed) in operation 314. In some embodiments, the threshold module 214 automatically collapses comments that are not directly related to draft content in the inline conversation area. If no predetermined threshold is exceeded, then the method 400 returns to operation 316.

In operation 406, relevance of content to a user is determined. In example embodiments, the relevance module 212 detects comments in the inline conversation area that are relevant to the user. Accordingly, the relevance module 212 machine learns what is relevant to a user. For example, the relevance module 212 analyses the conversation (e.g., comments) in the inline conversation area and identifies key aspects such as due date and @ mentions. Additionally, the relevance module 212 detects time spent commenting on content (or draft content), time spent editing draft content, or time spent reading comments or draft content in order to determine relevance. Over time, the relevance module 212 detects actions and keywords that the user uses in the inline conversation area to determine what is relevant to the user. In some cases, a user can set preferences for when the relevance module 212 should collapse inline content based on relevance. In some embodiments, the relevance may be used to determine what to collapse based on the determination that a predetermined threshold has been met or exceeded (e.g., in operation 404).

Figure 5A:
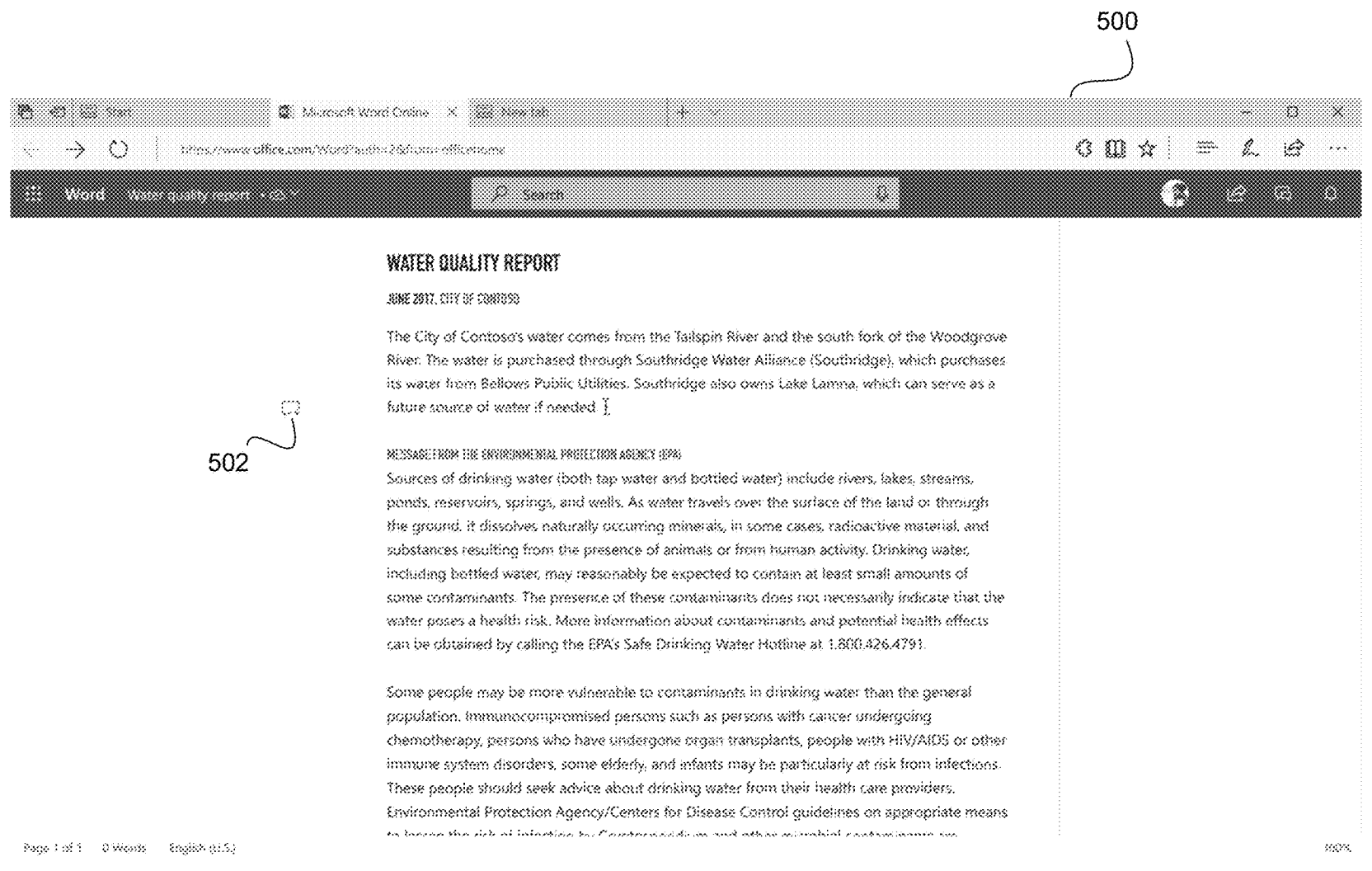
Figure 5B:
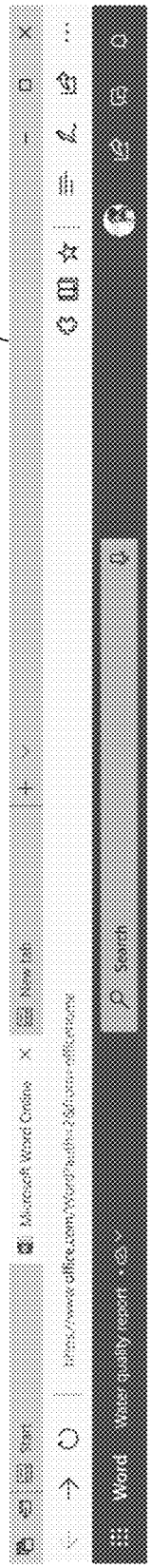

FIG. 5A-FIG. 5H are example screen shots of a user interface 500 illustrating usage of the inline conversation area in accordance with one embodiment. FIG. 5A shows the example user interface 500 displaying a document (e.g., water quality report) that is being collaborated on by multiple users. One of the users (e.g., named Kat) wants to start a conversation with her peers within the context of the document. Kat navigates to a location in the document where the conversation is likely relevant in context with content in the document. Kat then provides an indication to present an inline conversation area at the location. For example, Kat can select an inline conversation icon 502 at the location or right click to bring up a menu that presents a selectable inline conversation option.

Selection of the inline conversation icon or option causes the inline conversation area 504 to be added within the document as shown in FIG. 5B. An identifier 506 associated with Kat is presented in the inline conversation area 504. In the present example, the identifier 506 is an image of Kat. However, alternative embodiments may use a name or initials of the user to identify the user making the comment.

Figure 5C:
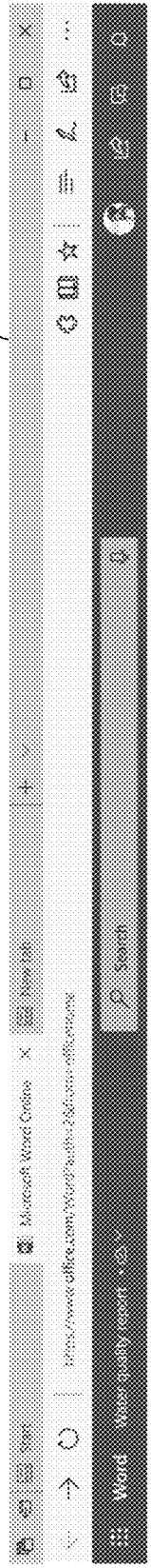

Referring now to FIG. 5C, Kat has entered her comments in the inline conversation area 504. Kat addresses the comment to one of her colleagues, Preeta Naidu by providing an @mention (e.g., @Preeta Naidu) in the comment. In the example, Kat is asking for more details to be added to the document. In example embodiments, the inline conversation area 504 also provides an indication of when comments were inputted (e.g., a few hours ago).

Figure 5D:
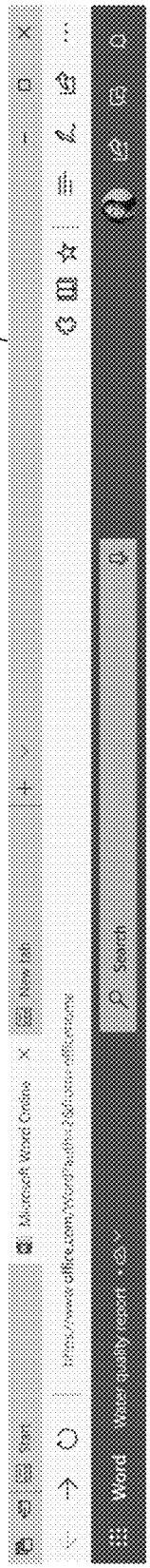

In FIG. 5D, Preeta responds to Kat in the inline conversation area 504. Preeta's response is indicated by an identifier 508 associated with Preeta. Further still, Preeta's comment is directed to Kat based on the @mention (e.g., @Kat). In some embodiments, the conversation module 208 intelligently recognizes the words "section below" in Preeta's comment and adds a draft space 510 for Preeta to enter draft content 512. In an alternative embodiment, the user may manual trigger the addition of the draft space 510. Accordingly, the collaboration system 102 can distinguish between conversation (e.g., comments) and draft content.

Figure 5E:
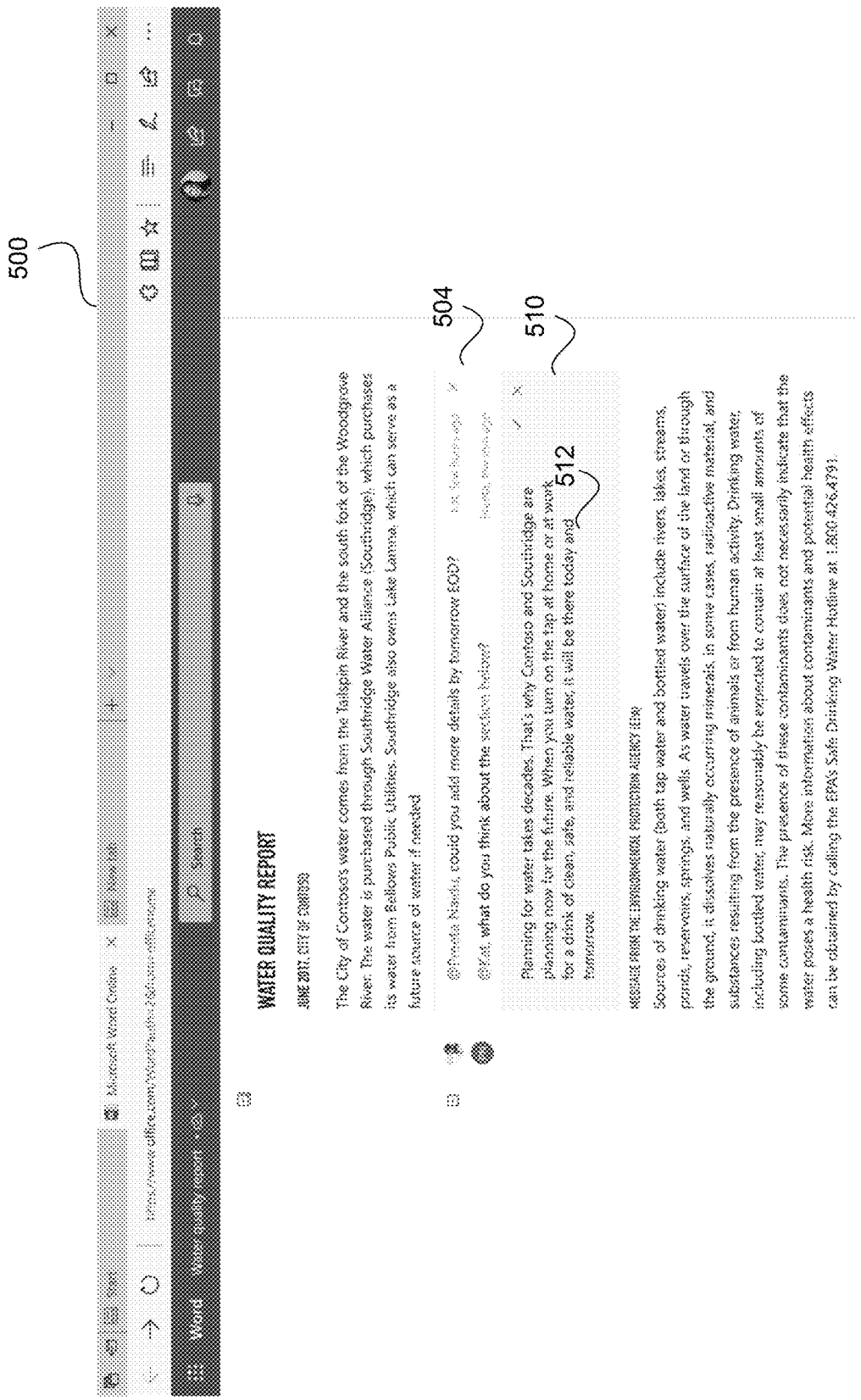

Referring now to FIG. 5E, Preeta provides the draft content 512 in the inline conversation area 504 (e.g., within the draft space 510). In example embodiments, the draft content 512 is visually distinguished from the comments being exchanged by the users. In the example of FIG. 5E, the draft space 510 is shown separated from the comments as a shaded portion of the inline conversation area 504.

Figure 5F:
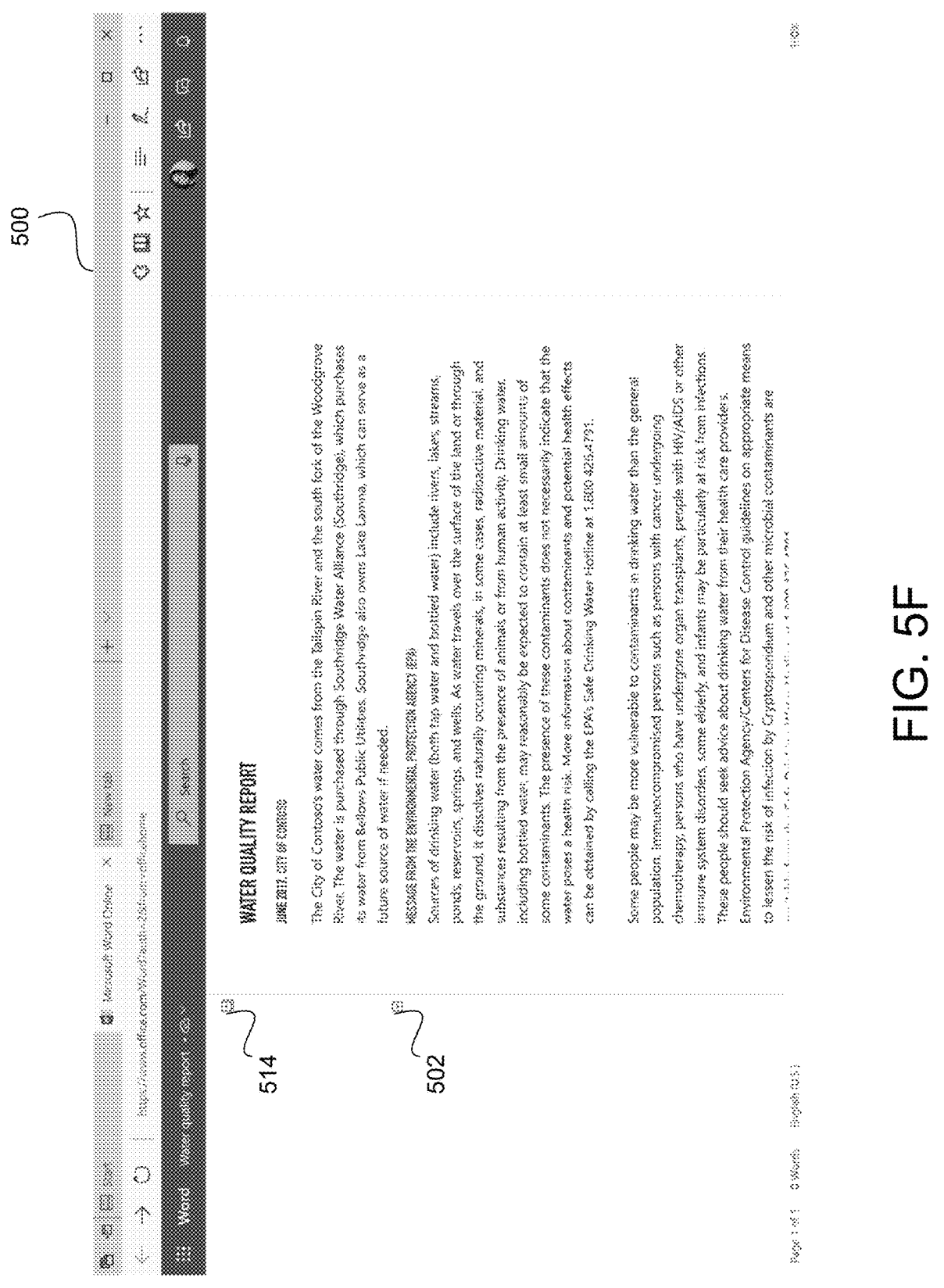

For comparison, Preeta can hide the conversation (e.g., collapse the inline conversation area 504) so that she can evaluate the document without comments or draft content. As shown in FIG. 5F, Preeta has hidden the inline conversation area 504 and only the content of the document is shown. In one embodiment, the inline conversation area 504 is collapsed in response to a user indication to hide the inline content (e.g., the comments and draft content 512). In the example of FIG. 5F, Preeta has selected an icon 514 that causes the inline conversation area 504 to be hidden. When Preeta is ready to expand or open back the inline conversation area 504, Preeta can select another icon (e.g., the inline conversation icon 502) to expand the collapsed inline conversation area 504. In another example, Preeta can select the icon 514 to expand the collapsed inline conversation area 504.

Figure 5G:
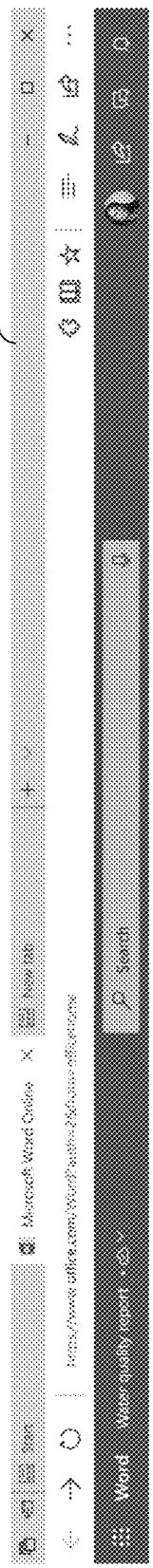

As the conversation continues in the inline conversation area 504, the inline conversation area 504 because scrollable (e.g., indicated by the scroll bar 516) so as to keep the draft content 512 visible, as shown in FIG. 5G, but hide some of the comments. That is, the comments may scroll while the draft content 512 stays visible at all times (unless collapsed by a user).

Also shown in FIG. 5G are edits to the draft content. For example, Kat has deleted some text (e.g., "and Southridge"), whereby the deletion is shown as a strikethrough. Alternative examples may use other visual cues to distinguish the deleted text. Kat has also added to the draft content (e.g., "This ensures that water will be available to the region for the future and in case of emergency."). The additional draft content is visually distinguished by highlighting. In an alternative embodiment, the additional draft content may be visually distinguished in a different manner such as with underlining.

If the users (here Kat and Preeta) agree that the draft content looks good and should be included in the content of the document, then one of the users selects an insert icon or option 518. In the example of FIG. 5G, the insert icon 518 is a check mark. However, alternative example can use other forms of icons.

Figure 5H:
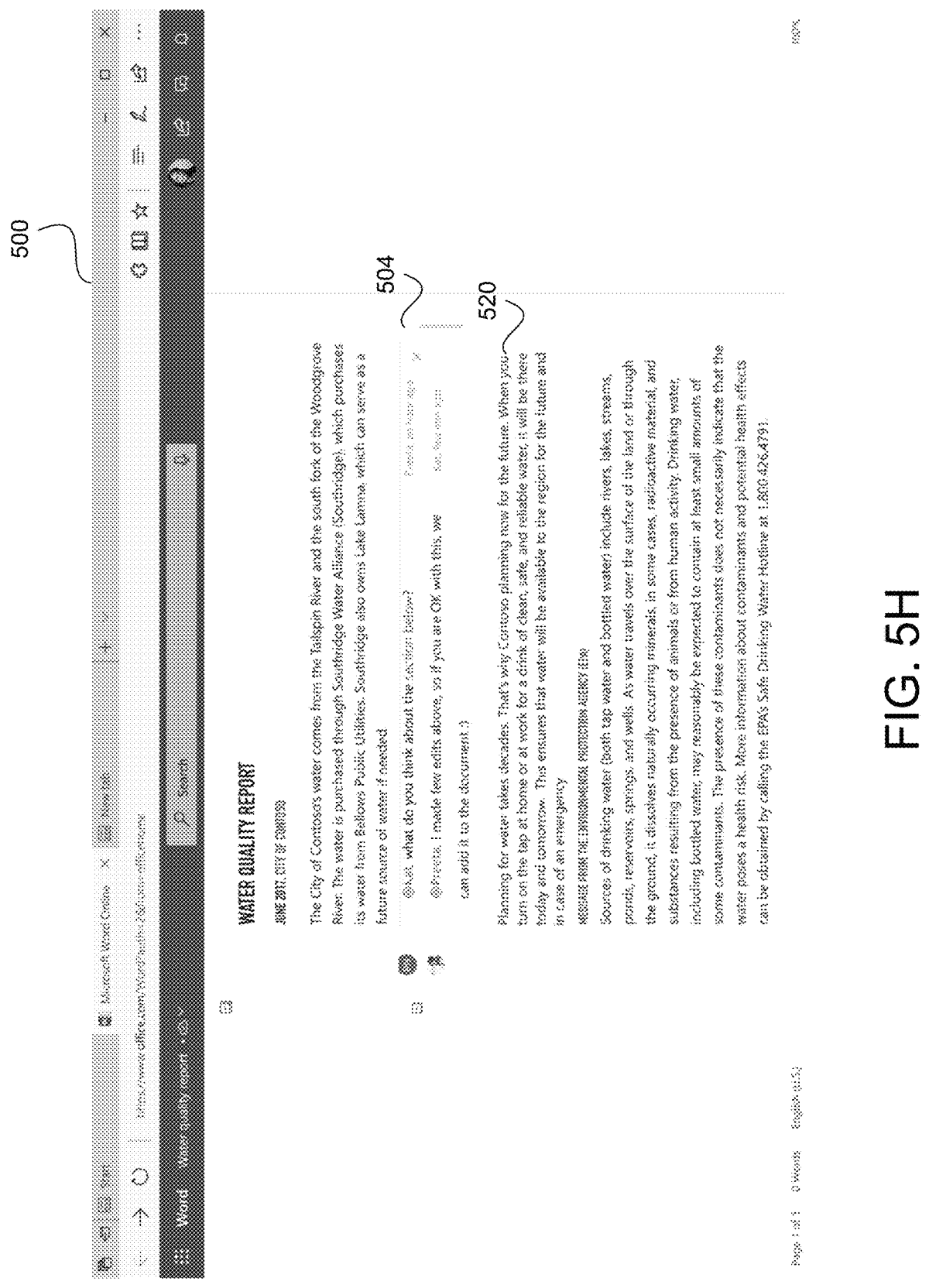

In response to the selection of the insert icon 518, the draft module 210 converts the draft content 512 into new document content 520 and inserts the new document content 520 below the inline conversation area 504 as shown in FIG. 5H. While the draft content has now been incorporated into the document, the conversation between Kat and Preeta can continue exchanging comments in the inline conversation area 504.

Figure 6A:
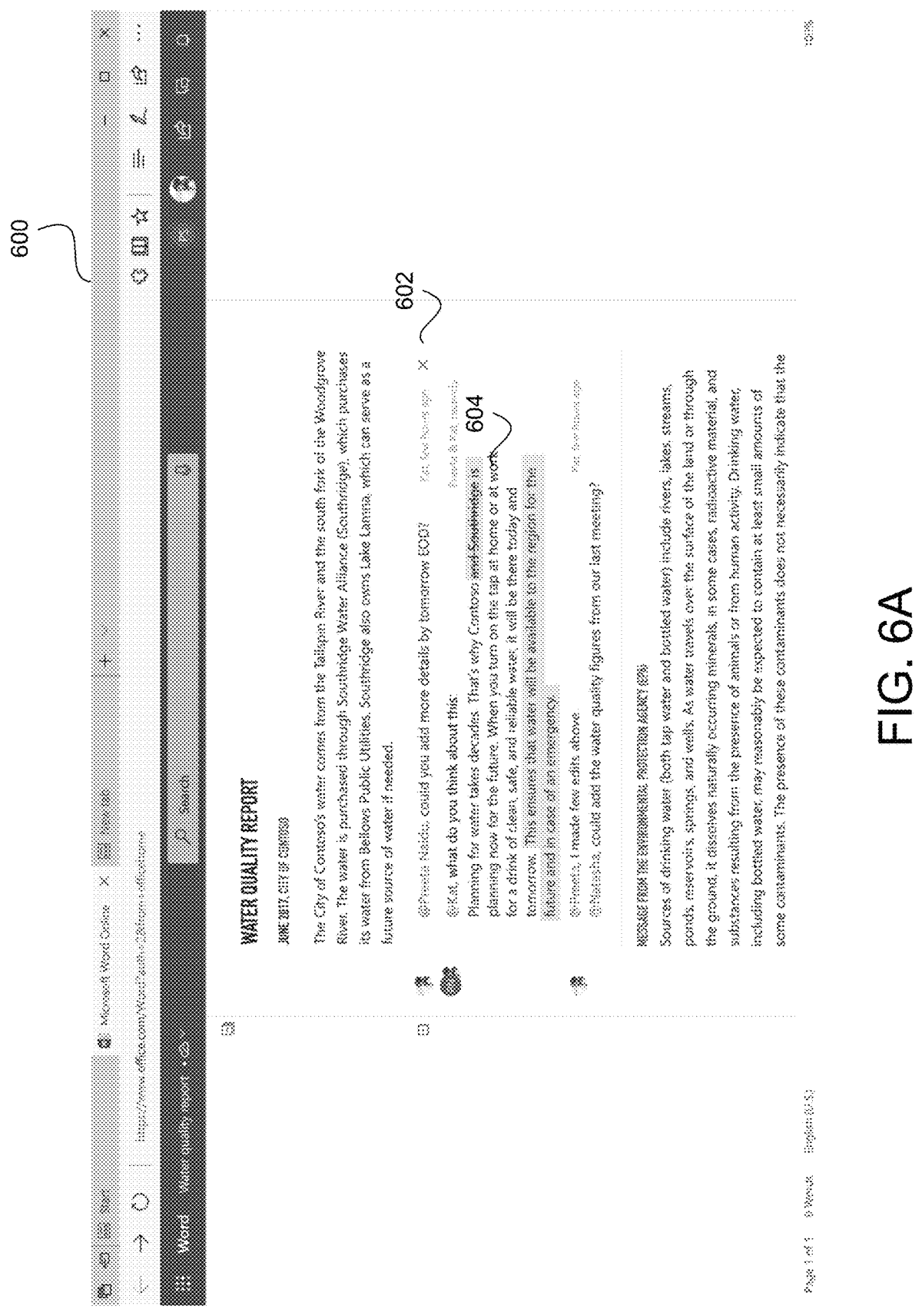
Figure 6B:
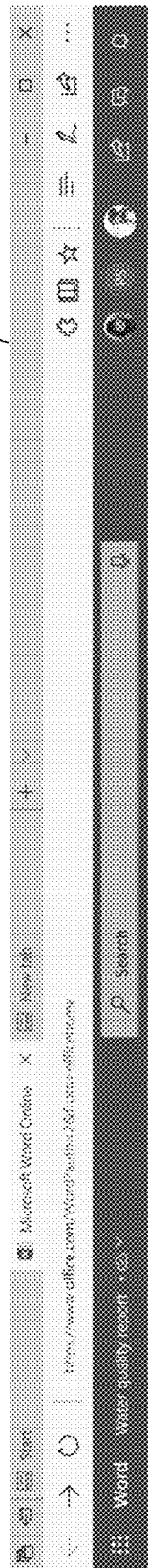

FIG. 6A-FIG. 6E are example screen shots of a user interface 600 illustrating usage of the inline conversation area in accordance with an alternative embodiment. In FIG. 6A, an inline conversation area 602 contains comments from Kat and Preeta along with draft content 604. As with the previous example, Kat has provided edits to the draft content that is shown visually distinguished from the initial draft content. In some embodiments, the edits can be removed from the draft content 604 in order to see a "clean version" of the draft content. For example, Preeta can select an icon to hide the edits. In the present example, the draft content 604 is shown in a draft space that is distinguished from the comments by a lack of an @mention. Further still, the draft content 604 is shown between comments involving Kat and Preeta.

Referring now to FIG. 6B, when the conversation becomes too rich (e.g., a threshold amount of comments is being exchanged), the collaboration system 102 can show only relevant content that is curated for each user. As such, the threshold module 214 detects that the predetermined threshold is exceed and based on relevance determined by the relevance module 212, comments that are determined (based on machine learning) to be relevant to each user or to the draft content 604 is shown. The remainder of the comments are hidden or collapsed from view as shown in FIG. 6B. A user can select to view the collapsed comments by selecting a corresponding icon or selection (e.g., "see more" icon 606).

Figure 6C:
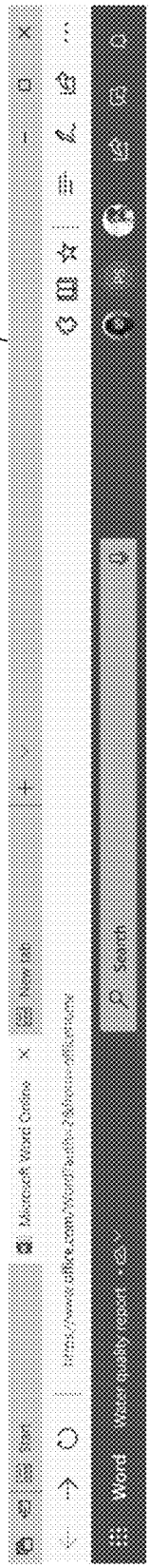
Figure 6D:
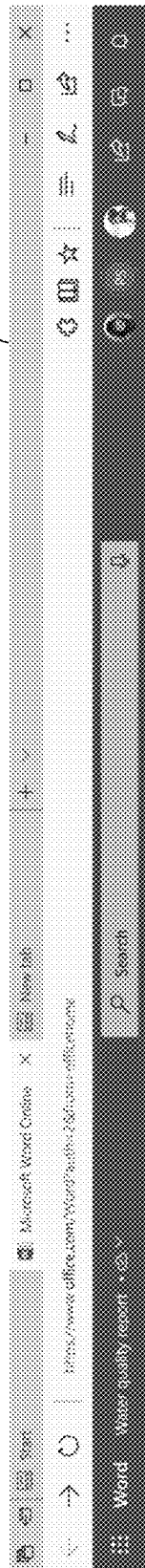

When the users decide to incorporate the draft content 604, the users can select, drag, and drop the draft content 604 (or a portion of the draft content 604). Referring now to FIG. 6C, one of the collaborators has selected the entire draft content 604 and is dragging the selected draft content 604 to a location where the draft content should be incorporated into the document. FIG. 6D shows the draft content 604 converted to new document content and inserted into the location in the document (e.g., below the inline conversation area 602).

Figure 6E:
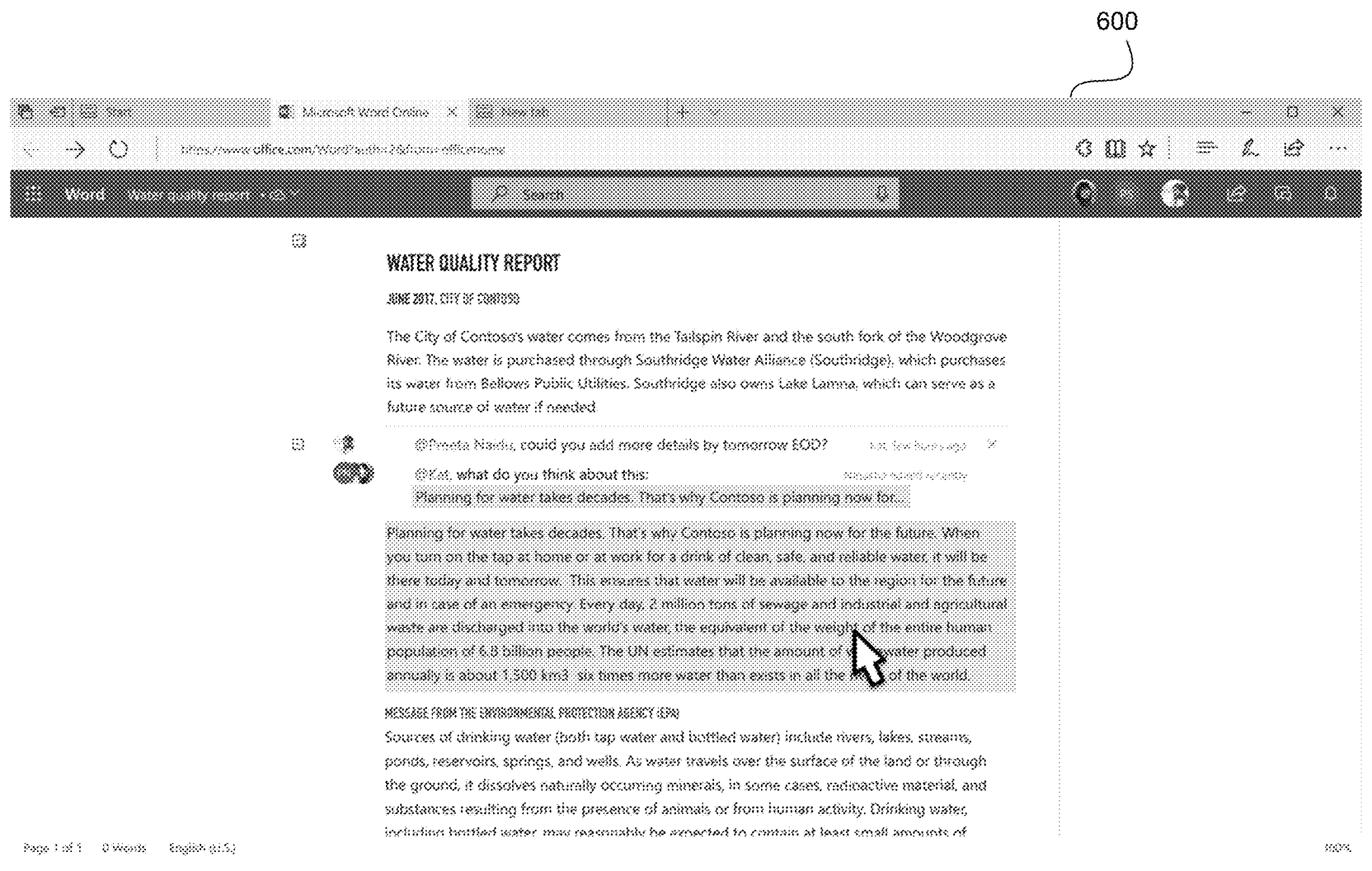

In some embodiments, a user can hover over (with a cursor) the new document content to see its relationship to the conversation in the inline conversation area 602 as shown in FIG. 6E. In particular, hovering over the new document content causes the draft content 604 to be highlighted in the inline conversation area 602. In some cases, relevant comments may also be highlighted or visually distinguished.

Figure 7:
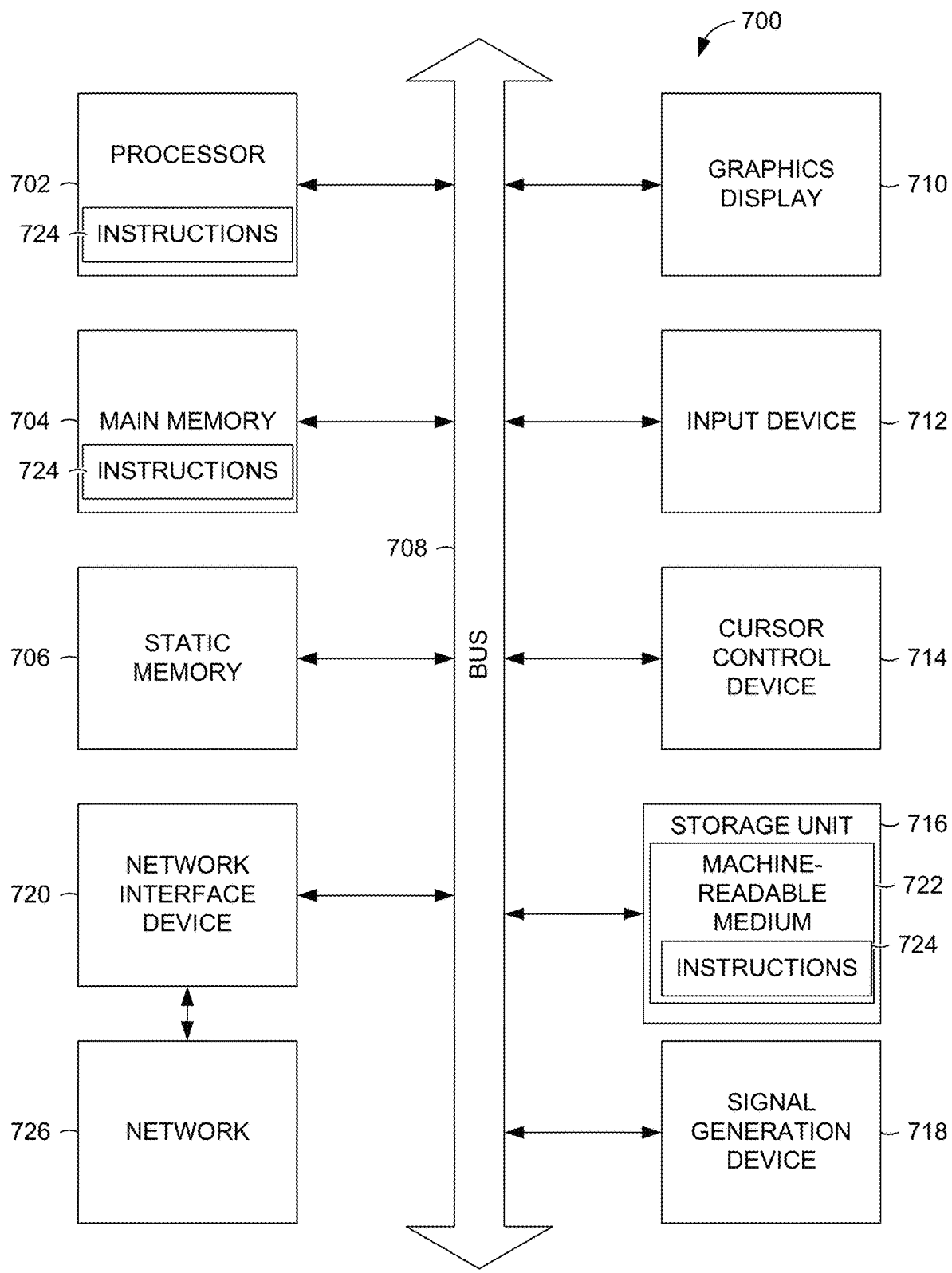
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 3 and 4. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-readable medium 722 (e.g., a tangible machine-readable storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, to the extent such media are deemed too transitory. Other such media are also covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for managing an inline conversation area within a document. The method comprises causing presentation of a user interface on a display device, the user interface displaying a document that is being collaboratively edited by a plurality of users; receiving an indication to present an inline conversation area within the document; in response to receiving the indication, causing presentation, by a hardware processor, of the inline conversation area within the document on the user interface, the inline conversation area being visually distinguished from document content; receiving, via the inline conversation area, input from the plurality of users, the input comprising comments being exchanged between the plurality of users; and causing presentation of the comments in the inline conversation area within the document on the user interface.

In example 2, the subject matter of example 1 can optionally include wherein the input further comprises draft content, the draft content being proposed content that is addable to the content of the document, the draft content being visually distinguished from the comments in the inline conversation area and the document content.

In example 3, the subject matter of examples 1-2 can optionally include receiving a selection of at least a portion of the draft content, an indication to drag the selected draft content to a location in the document, and an indication to drop the selected draft content into the location of the document; and in response to receiving the selection and the indications, converting the selected draft content into new document content and inserting the new document content into the location indicated by the drop selection.

In example 4, the subject matter of examples 1-3 can optionally include receiving an insert selection associated with the draft content; and in response to receiving the insert selection, converting the draft content into new document content and inserting the new document content into the document below the inline conversation area.

In example 5, the subject matter of examples 1-4 can optionally include wherein the draft content is originally provided by a first user of the plurality of users, the method further comprising receiving an edit to the draft content from a second user of the plurality of users; and visually distinguishing the edit from the second user in the draft content.

In example 6, the subject matter of examples 1-5 can optionally include receiving an indication to hide all inputs in the inline conversation area; and in response to receiving the indication to hide all inputs, collapsing the inline conversation area.

In example 7, the subject matter of examples 1-6 can optionally include receiving an indication to hide comments from a particular user of the plurality of users; and in response to receiving the indication to hide comments, collapsing the comments for the particular user in the inline conversation area.

In example 8, the subject matter of examples 1-7 can optionally include detecting comments in the inline conversation area relevant to a particular user; and automatically collapsing comments in the inline conversation area that are not relevant to the particular user.

In example 9, the subject matter of examples 1-8 can optionally include detecting comments in the inline conversation area relevant to a particular user; and visually distinguishing the relevant comments in the inline conversation area.

In example 10, the subject matter of examples 1-9 can optionally include determining that the input within the inline conversation area exceeds a predetermined threshold; and in response to determining that the input within the inline conversation area exceeds the predetermined threshold, automatically collapsing comments not directly related to the draft content.

In example 11, the subject matter of examples 1-10 can optionally include wherein the indication is triggered near the location in the document where the inline conversation area is to be presented.

Example 12 is a system for managing an inline conversation area within a document. The system includes one or more processors and a storage device storing instructions that, when executed by the one or more hardware processors, causes the one or more hardware processors to perform operations comprising causing presentation of a user interface on a display device, the user interface displaying a document that is being collaboratively edited by a plurality of users; receiving an indication to present an inline conversation area within the document; in response to receiving the indication, causing presentation of the inline conversation area within the document on the user interface, the inline conversation area being visually distinguished from document content; receiving, via the inline conversation area, input from the plurality of users, the input comprising comments being exchanged between the plurality of users; and causing presentation of the comments in the inline conversation area within the document on the user interface.

In example 13, the subject matter of example 12 can optionally include wherein the input further comprises draft content, the draft content being proposed content that is addable to the content of the document, the draft content being visually distinguished from the comments in the inline conversation area and the document content.

In example 14, the subject matter of examples 12-13 can optionally include receiving a selection of at least a portion of the draft content, an indication to drag the selected draft content to a location in the document, and an indication to drop the selected draft content into the location of the document; and in response to receiving the selection and the indications, converting the selected draft content into new document content and inserting the new document content into the location indicated by the drop selection.

In example 15, the subject matter of examples 12-14 can optionally include receiving an insert selection associated with the draft content; and in response to receiving the insert selection, converting the draft content into new document content and inserting the new document content into the document below the inline conversation area.

In example 16, the subject matter of examples 14-15 can optionally include wherein the draft content is originally provided by a first user of the plurality of users, wherein the operations further comprise receiving an edit to the draft content from a second user of the plurality of users; and visually distinguishing the edit from the second user in the draft content.

In example 17, the subject matter of examples 14-16 can optionally include receiving an indication to hide all inputs in the inline conversation area; and in response to receiving the indication to hide all inputs, collapsing the inline conversation area.

In example 18, the subject matter of examples 14-17 can optionally include receiving an indication to hide comments from a particular user of the plurality of users; and in response to receiving the indication to hide comments, collapsing the comments for the particular user in the inline conversation area.

In example 19, the subject matter of examples 14-18 can optionally include detecting comments in the inline conversation area relevant to a particular user; and automatically collapsing comments in the inline conversation area that are not relevant to the particular user.

Example 20 is a machine-storage medium for managing an inline conversation area within a document. The machine-storage medium configures one or more processors to perform operations comprising causing presentation of a user interface on a display device, the user interface displaying a document that is being collaboratively edited by a plurality of users; receiving an indication to present an inline conversation area within the document; in response to receiving the indication, causing presentation of the inline conversation area within the document on the user interface, the inline conversation area being visually distinguished from document content; receiving, via the inline conversation area, input from the plurality of users, the input comprising comments being exchanged between the plurality of users; and causing presentation of the comments in the inline conversation area within the document on the user interface.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:

causing presentation of a user interface on a display device, the user interface displaying content of a document that is being collaboratively edited by a plurality of users;

receiving an indication to present an inline conversation area within the document;

in response to receiving the indication, causing presentation, by a hardware processor, of the inline conversation area within the document on the user interface, the inline conversation area comprising a separate area that is presented between the displayed content and visually distinguished from document content of the document, the inline conversation area comprising a comment section and a separate draft content section that are adjacent to each other;

receiving, via the inline conversation area, input from the plurality of users, the input comprising a plurality of comments being exchanged between the plurality of users and draft content, the draft content being proposed content for inclusion in the document content; and causing presentation of the plurality of comments in the comment section and the draft content in the draft content section of the inline conversation area, the comment section being scrollable to hide one or more of the plurality of comments while the entire draft content in the draft content section remains visible.

2. The method of claim 1, further comprising:

receiving a selection of at least a portion of the draft content, an indication to drag the selected portion of the draft content to a location in the document content of the document, and an indication to drop the selected draft content into the location in the document content of the document; and in response to receiving the selection and the indications, converting the selected draft content into new document content and inserting the new document content into the location in the document content indicated by the drop selection.

3. The method of claim 1, further comprising:

receiving an insert selection associated with the draft content; and in response to receiving the insert selection, converting the draft content into new document content and inserting the new document content into the document content of the document below the inline conversation area.

4. The method of claim 1, wherein the draft content is originally provided by a first user of the plurality of users, the method further comprising:

receiving an edit to the draft content from a second user of the plurality of users; and visually distinguishing the edit from the second user in the draft content.

5. The method of claim 1, further comprising:

receiving an indication to hide all inputs in the inline conversation area; and in response to receiving the indication to hide all inputs, collapsing the inline conversation area.

6. The method of claim 1, further comprising:

receiving an indication to hide comments from a particular user of the plurality of users; and in response to receiving the indication to hide comments, collapsing the comments for the particular user in the inline conversation area.

7. The method of claim 1, further comprising:
detecting comments in the inline conversation area relevant to a particular user; and
automatically collapsing comments in the inline conversation area that are not relevant to the particular user.

8. The method of claim 1, further comprising:
detecting comments in the inline conversation area relevant to a particular user; and
visually distinguishing the relevant comments in the inline conversation area.

9. The method of claim 1, further comprising:
determining that the input within the inline conversation area exceeds a predetermined threshold; and
in response to determining that the input within the inline conversation area exceeds the predetermined threshold, automatically collapsing one or more of the comments.

10. The method of claim 1, further comprising:
receiving a scroll input applied to the comment section; and
in response to receiving the scroll input, scrolling the plurality of comments within the comment section to hide one or more of the plurality of comments while the entire draft content in the draft content section remains visible.

11. A system comprising:
one or more hardware processors; and
a storage device storing instructions that, when executed by the one or more hardware processors, cause the one or more hardware processors to perform operations comprising:
causing presentation of a user interface on a display device, the user interface displaying content of a document that is being collaboratively edited by a plurality of users;
receiving an indication to present an inline conversation area within the document;
in response to receiving the indication, causing presentation of the inline conversation area within the document on the user interface, the inline conversation area comprising a separate area that is presented between the displayed content and visually distinguished from document content of the document, the inline conversation area comprising a comment section and a separate draft content section that are adjacent to each other;
receiving, via the inline conversation area, input from the plurality of users, the input comprising a plurality of comments being exchanged between the plurality of users and draft content, the draft content being proposed content for inclusion in the document content; and
causing presentation of the plurality of comments in the comment section and the draft content in the draft content section of the inline conversation area, the comment section being scrollable to hide one or more of the plurality of comments while the entire draft content in the draft content section remains visible.

12. The system of claim 11, wherein the operations further comprise:
receiving a selection of at least a portion of the draft content, an indication to drag the portion of the selected draft content to a location in the document content of the document, and an indication to drop the selected draft content into the location in the document content of the document; and
in response to receiving the selection and the indications, converting the selected draft content into new document content and inserting the new document content into the location in the document content indicated by the drop selection.

13. The system of claim 11, wherein the operations further comprise:
receiving an insert selection associated with the draft content; and
in response to receiving the insert selection, converting the draft content into new document content and inserting the new document content into the document content of the document below the inline conversation area.

14. The system of claim 11, wherein the draft content is originally provided by a first user of the plurality of users, wherein the operations further comprise:
receiving an edit to the draft content from a second user of the plurality of users; and
visually distinguishing the edit from the second user in the draft content.

15. The system of claim 11, wherein the operations further comprise:
receiving an indication to hide all inputs in the inline conversation area; and
in response to receiving the indication to hide all inputs, collapsing the inline conversation area.

16. The system of claim 11, wherein the operations further comprise:
receiving an indication to hide comments from a particular user of the plurality of users; and
in response to receiving the indication to hide comments, collapsing the comments for the particular user in the inline conversation area.

17. The system of claim 11, wherein the operations further comprise:
detecting comments in the inline conversation area relevant to a particular user; and
automatically collapsing comments in the inline conversation area that are not relevant to the particular user.

18. A machine storage medium storing instructions that, when executed by one or more hardware processors of a machine, cause the machine to perform operations comprising:
causing presentation of a user interface displaying content of a document that is being collaboratively edited by a plurality of users;
receiving an indication to present an inline conversation area within the document;
in response to receiving the indication, causing presentation of the inline conversation area within the document on the user interface, the inline conversation area comprising a separate area that is presented between the displayed content and visually distinguished from document content of the document, the inline conversation area comprising a comment section and a separate draft content section that are adjacent to each other;
receiving, via the inline conversation area, input from the plurality of users, the input comprising a plurality of comments being exchanged between the plurality of users and draft content, the draft content being proposed content for inclusion in the document content; and causing presentation of the plurality of comments in the comment section and the draft content in the draft content section of the inline conversation area, the comment section being scrollable to hide one or more of the plurality of comments while the entire draft content in the draft content section remains visible.

* * * * *